(12) United States Patent
Sealy et al.

(10) Patent No.: US 7,647,765 B2
(45) Date of Patent: *Jan. 19, 2010

(54) SECONDARY AIRFLOW SYSTEM FOR ENGINE EXHAUST EMISSION DIAGNOSTICS

(75) Inventors: Brent Sealy, Dearborn, MI (US); Jeff Doering, Canton, MI (US); Michael Cullen, Northville, MI (US); David Wright, Ann Arbor, MI (US); Paul Pietrzyk, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

This patent is subject to a terminal disclaimer.

(21) Appl. No.: 11/551,596

(22) Filed: Oct. 20, 2006

(65) Prior Publication Data

US 2007/0039313 A1  Feb. 22, 2007

Related U.S. Application Data

(62) Division of application No. 10/901,570, filed on Jul. 28, 2004, now Pat. No. 7,131,262.

(51) Int. Cl.
*F01N 3/00* (2006.01)
(52) U.S. Cl. .............................. 60/277; 60/289; 60/290; 60/291; 60/292; 73/114.69; 73/114.75; 123/533; 123/585

(58) Field of Classification Search ................ 60/274, 60/276, 277, 289, 290, 293, 304; 73/118.1, 73/40, 114.69, 114.71, 114.75; 123/531, 123/532, 533, 585
See application file for complete search history.

(56) References Cited

U.S. PATENT DOCUMENTS

| | | | | |
|---|---|---|---|---|
| 5,560,199 | A * | 10/1996 | Agustin et al. | 60/274 |
| 6,192,678 | B1 * | 2/2001 | Tachibana | 60/289 |
| 6,830,043 | B2 * | 12/2004 | Morinaga al. | 123/698 |
| 6,945,035 | B2 * | 9/2005 | Hirooka et al. | 60/289 |
| 6,973,777 | B2 * | 12/2005 | Bayerle et al. | 60/289 |
| 7,140,177 | B2 * | 11/2006 | Koyama et al. | 60/289 |
| 7,222,483 | B2 * | 5/2007 | Oi et al. | 60/289 |

* cited by examiner

*Primary Examiner*—Binh Q Tran
(74) *Attorney, Agent, or Firm*—Allan J. Lippa; Alleman Hall McCoy Russell & Tuttle LLP

(57) ABSTRACT

In one example, a system for an engine having an intake system and an exhaust system is described. The system comprises: an airflow sensor coupled to the intake system; an air pump having at least an inlet side and an outlet side, said inlet side having a first coupling to the intake system downstream of said airflow sensor, said outlet side having a second coupling to the exhaust system; and a controller coupled to the engine, said controller, during operation, identifying whether degradation has occurred to at least one of said first and second couplings, and providing an indication of said identified degradation. Various other examples are also disclosed.

5 Claims, 11 Drawing Sheets

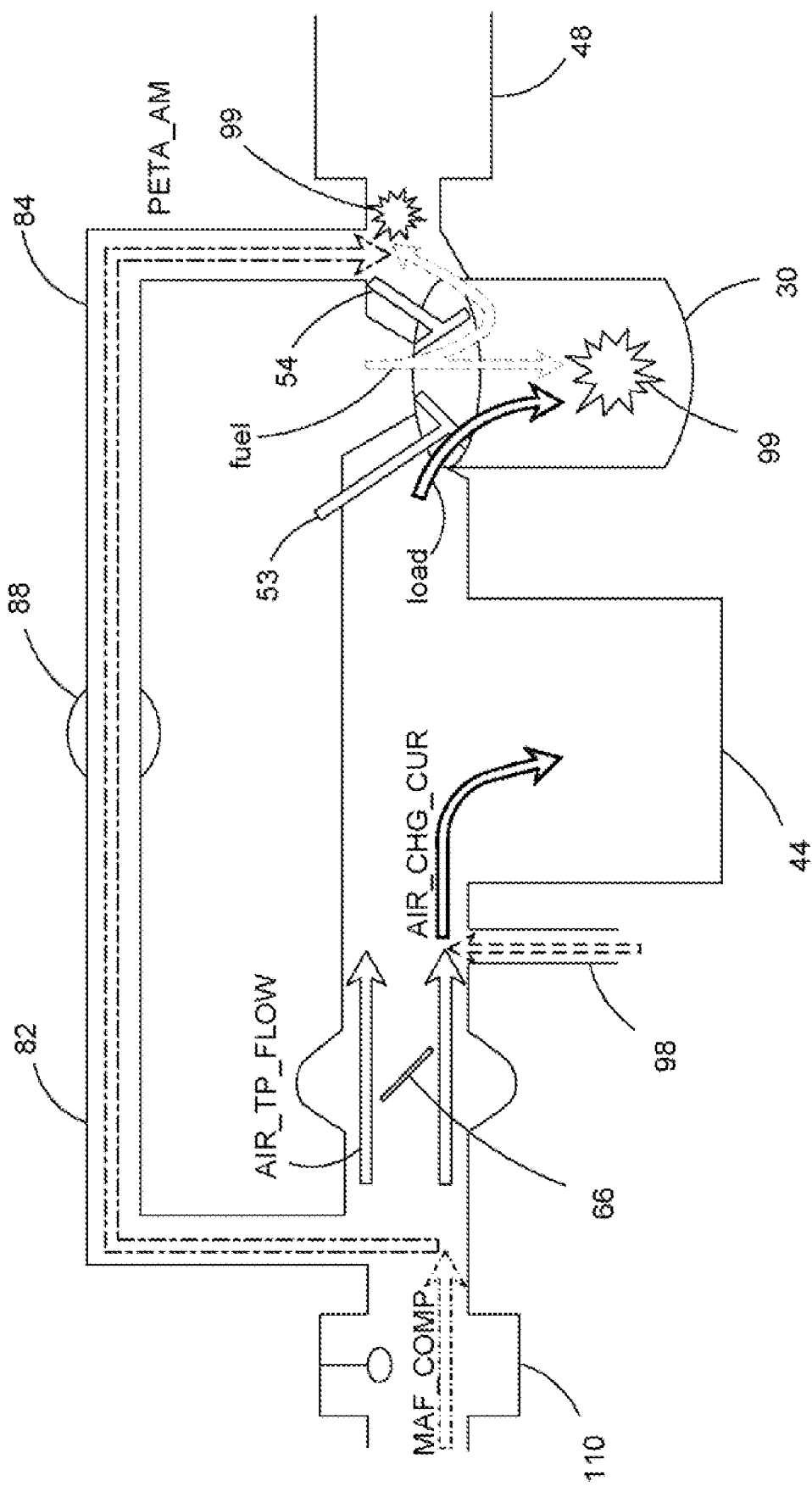

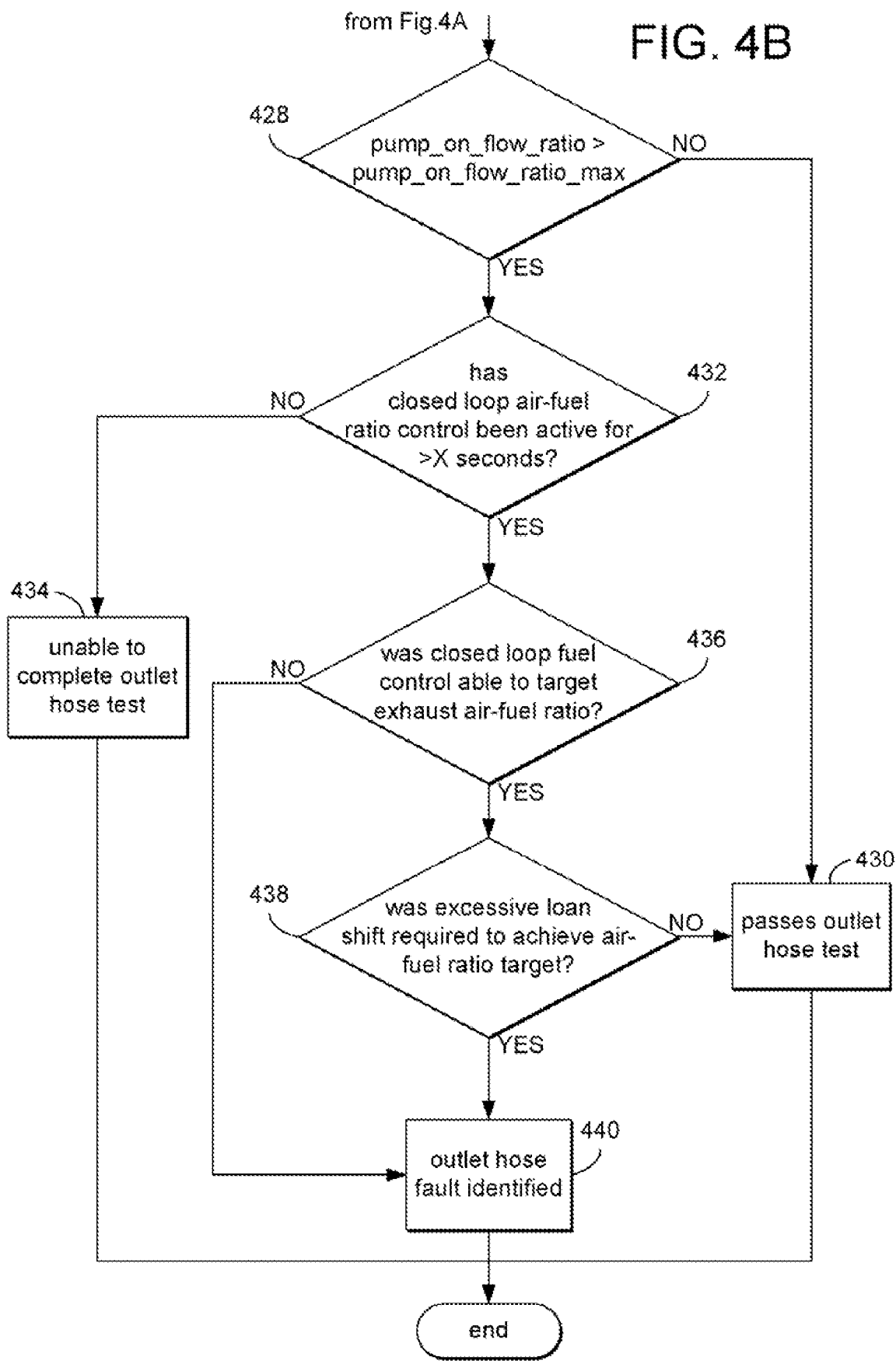

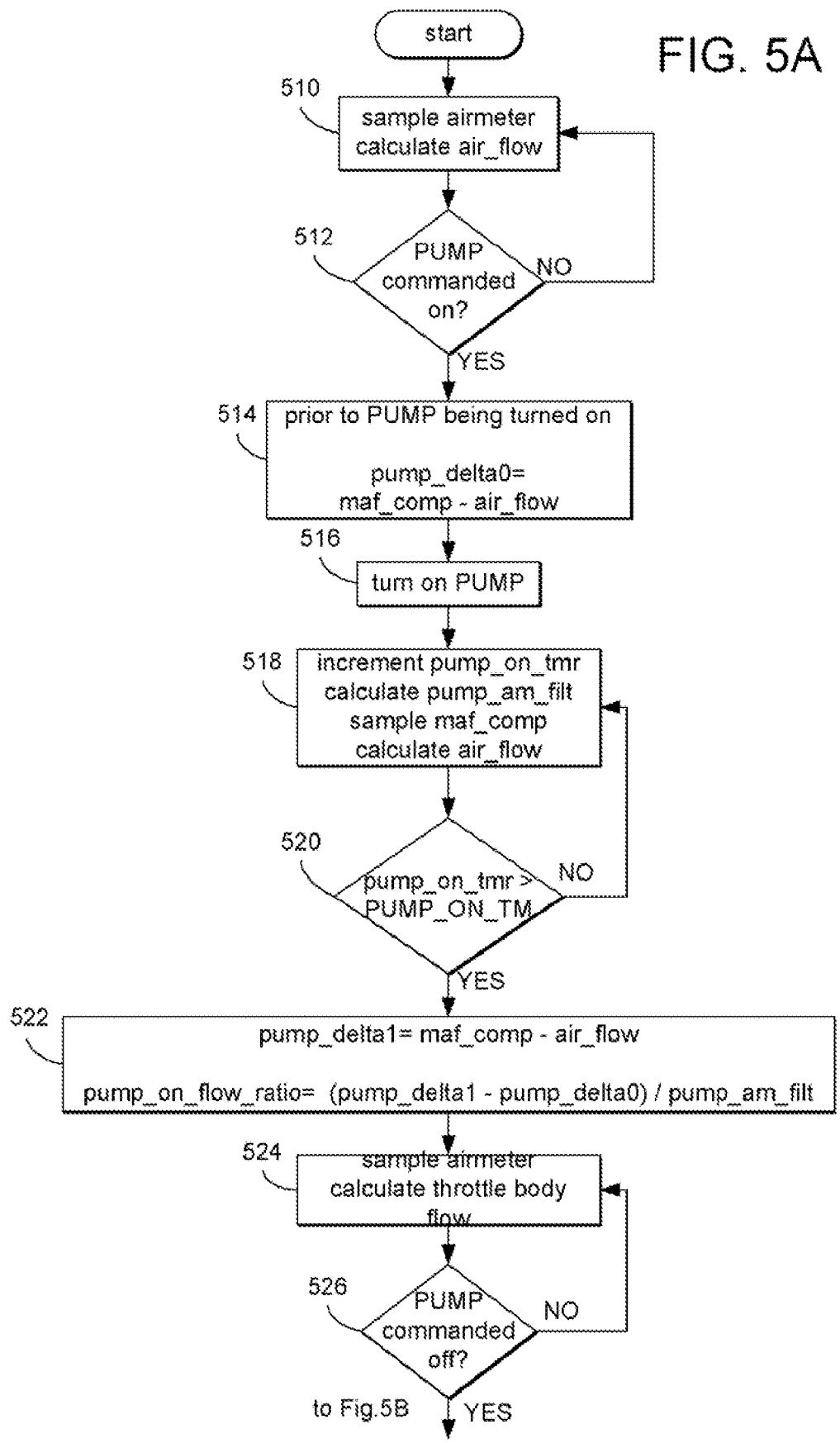

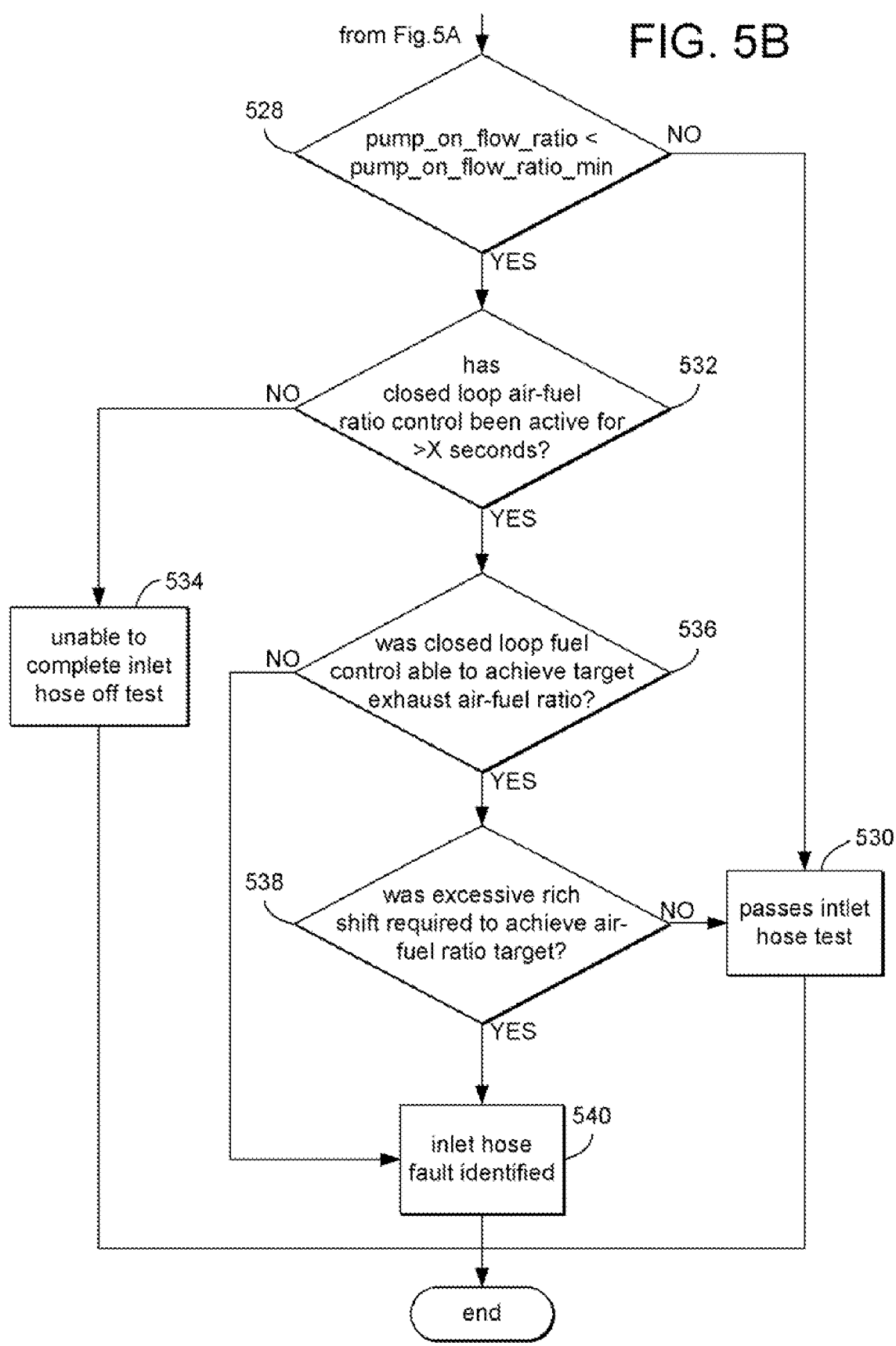

SECONDARY AIRFLOW SYSTEM FOR ENGINE EXHAUST EMISSION DIAGNOSTICS

The present application is a divisional of U.S. patent application Ser. No. 10/901,570, filed Jul. 28, 2004, titled "Secondary Airflow System for Engine Exhaust Emission Diagnostics," the entire contents of which are incorporated herein by reference.

FIELD

The field of the disclosure relates to a system for diagnosing secondary air introduction in an exhaust system of an internal combustion engine of a motor vehicle.

BACKGROUND AND SUMMARY

Engines take various approaches to increase exhaust temperature during an engine start to increase catalyst converter activity, and thereby reduce emissions. In one approach, such as in U.S. Pat. No. 6,640,539, airflow is pumped in to an engine exhaust manifold, while the cylinders are operated rich, to generate an exothermic reaction of rich gasses and oxygen.

However, the inventors herein have recognized that when such a system is used in a configuration where the airflow is drawn from downstream of a mass airflow sensor, various types of degradation may occur. As one example, inlet and outlet couplings can become loose or disconnected, thereby affecting operation. In such a system, a disconnected inlet hose may produce an excessively lean air-fuel ratio. Alternatively, a disconnected outlet hose may produce an excessively rich mixture. In either case, the pump is still functioning yet operation may be degraded.

Further, in another example, even when pump hoses are functioning, pump degradation of the pump itself may occur. There also may be engine operating conditions where even properly functioning elements may produce degraded operation.

At least some of these and other situations may be addressed, in one example, by a system for an engine having an intake system and an exhaust system. The system comprises an airflow sensor coupled to the intake system; an air pump having at least an inlet side and an outlet side, said inlet side having a first coupling to the intake system downstream of said airflow sensor, said outlet side having a second coupling to the exhaust system; and a controller coupled to the engine, said controller, during operation, identifying whether degradation has occurred to at least one of said first and second couplings, and providing an indication of said identified degradation.

In this way, it may be possible to provide a configuration that enables accurate air-fuel ratio control (since the total amount of airflow in the exhaust can be measured from the airflow sensor) while also providing accurate diagnostics. In one example, it is possible to accurately indicate inlet or outlet coupling degradation without requiring additional sensors in the secondary air system, such as an additional mass airflow sensor, or a pressure differential sensor measurement (although they could be added, if desired).

In another embodiment, at least some of the above issues and other issues may be addressed by a system for an engine having an intake system and an exhaust system. The system comprises an airflow sensor coupled to the intake system; an air pump having at least an inlet side and an outlet side; a first duct having at least a first end coupled to said inlet of said pump and a second end coupled to the intake system downstream of said airflow sensor; a second duct having at least a first end coupled to said outlet of said pump and a second end coupled to the exhaust system; and a controller coupled to the engine, said controller, during operation, identifying whether degradation has occurred to at least said pump based on a ratio of a first and second pump flow estimates, and providing an indication of said identified degradation.

In this way, it may be possible to determine pump degradation based on whether a ratio of pump flow estimates is within a selected range to reduce the effect of estimation errors on diagnostic determinations. In other words, rather than simply considering whether absolute pump flow is outside an allowable range, it is possible to use a relative ratio of pump flows (such as after pump turn on and before pump turn off), thereby reducing the relative effect of estimation errors.

In still another embodiment, at least some of the above issues and other issues may be addressed by a system for an engine having an intake system and an exhaust system. The system comprises an airflow sensor coupled to the intake system; an air pump having at least an inlet side and an outlet side; a first duct having at least a first coupling to the intake system downstream of said airflow sensor, and a second coupling to the exhaust system; and a controller coupled to the engine, said controller discontinuing pump flow when manifold vacuum or pump flow is below a threshold.

In this way, conditions may be reduced or avoided in which the benefits of increased heat generation during engine starting conditions may be outweighed by increased fuel economy and lost engine output.

An advantage of several of the above features is that it may be possible to isolate and distinguish between various types of degradation. This can be beneficial to determine which diagnostic codes to set and thereby indicate more precise diagnostic information to vehicle mechanics, for example.

BRIEF DESCRIPTION OF THE DRAWINGS

FIG. 3 shows a diagram of engine and secondary flow modeling; and

FIGS. 4-8 show example high level flow charts of various features of various embodiments of the present disclosure.

DETAILED DESCRIPTION

Figure 1:
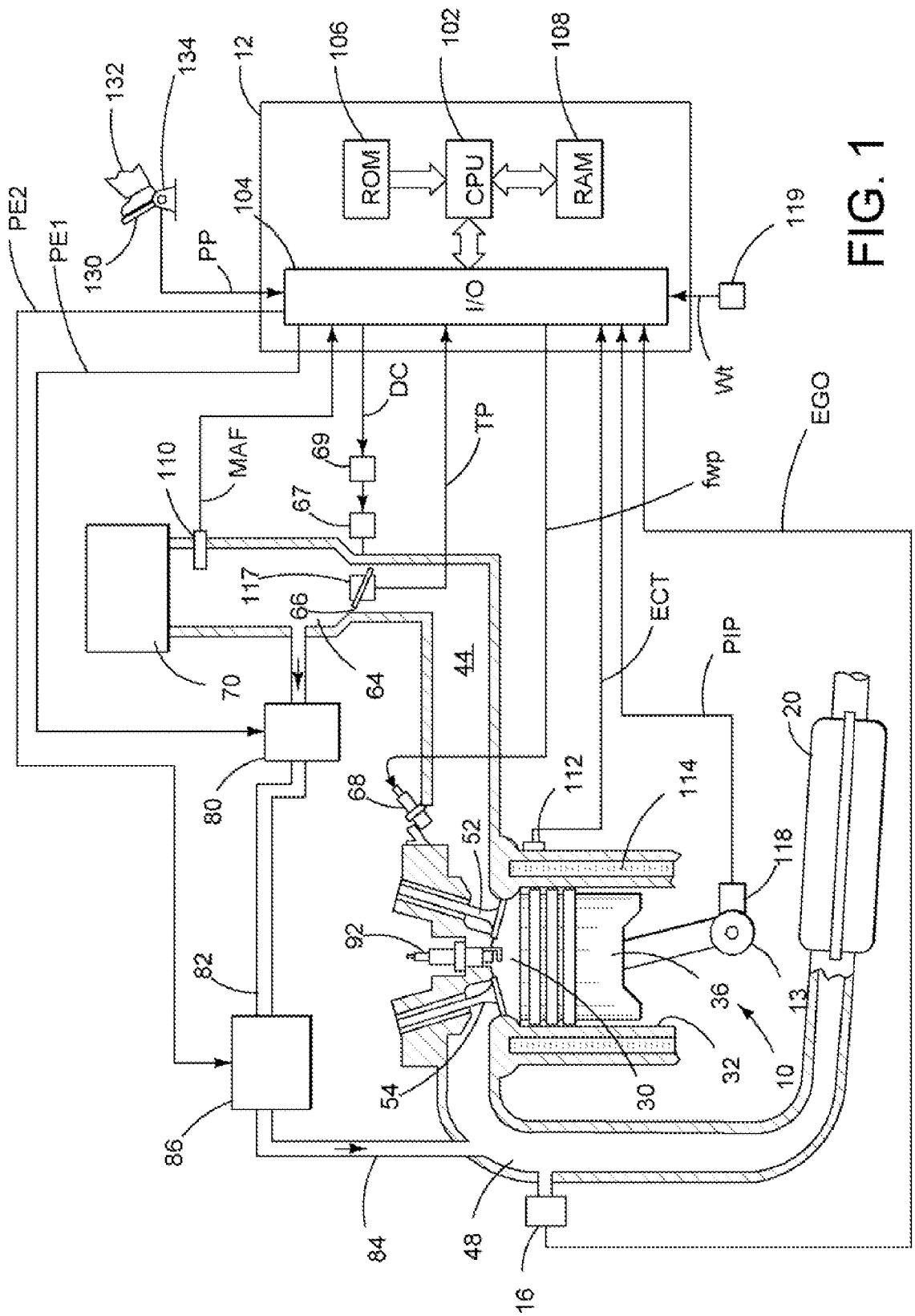
FIGS. 1 and 2 show example schematics of engines with a secondary air system.

Internal combustion engine 10 comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. In one example, throttle plate 66 may be located in the intake system downstream of mass airflow sensor 110, which may be located downstream of air filter 70.

Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). In an alternative embodiment, direct fuel injection can be used where fuel injector 68 is located to directly inject fuel into combustion chamber 30.

Engine 10 may also have a secondary air injection system for directing air from the intake system to the exhaust system. In example, this operation is conducted during engine starting, along with a rich combustion air-fuel ratio (e.g., greater than about 12:1, or 13:1, or 12.4:1) to create an exothermic reaction in the exhaust between rich combustion gasses and fresh air from the secondary air injection system. For example, in one embodiment the secondary air system may pump approximately 28% of exhaust airflow and 42% of engine airflow during idle conditions. Therefore, during pump operation during starting conditions, the engine may be operated approximately 28% rich. Further pump operation is generally enabled when air temperature is greater than 40 degrees F. and engine coolant temperature is between 40 and 165 degrees F. However, other limit values may be used, if desired.

One example secondary air system is shown in FIG. 1, where air pump 80 receives fresh metered airflow from inlet duct 82 and provides said fresh metered airflow to the exhaust system via outlet duct 84 coupled to exhaust manifold 48. In one embodiment, the inlet duct is approximately a ¾ inch diameter hose. The pump can be an on/off pump, or variable control pump. Also, the ducts 82 and 84 include hoses, pipes, tubes, or other such coupling devices, or combinations thereof, and can be made of plastic, metal, rubber, or combinations thereof, for example. For example, the ducts may be enclosed passages or channels for conveying a substance, such as a liquid or gas. The system may also include a vacuum operated control and check valve, designated collectively at 86. The vacuum control valve can be electrically actuated via controller 12 via signal PE2, and pump 86 can be activated via signal PE1. Further details of an example system are described in FIG. 2 below.

Engine 10 further includes a distributorless ignition system (not shown) to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass airflow (MAF) from mass airflow sensor 110 coupled to throttle body 64; engine coolant temperature (ECT) from temperature sensor 112 coupled to cooling jacket 114; a measurement of throttle position (TP) from throttle position sensor 117 coupled to elliptical throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Continuing with FIG. 1, accelerator pedal 130 is shown communicating with the driver's foot 132. Accelerator pedal position (PP) is measured by pedal position sensor 134 and sent to controller 12.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Internal combustion engine 10 may be coupled to torque converter via crankshaft 13. The torque converter may also be coupled to transmission via a turbine shaft. The torque converter may have a bypass clutch which can be engaged, disengaged, or partially engaged. When the clutch is either disengaged or partially engaged, the torque converter is said to be in an unlocked state. The turbine shaft may also be known as a transmission input shaft. The transmission comprises an electronically controlled transmission with a plurality of selectable discrete gear ratios. The transmission may also comprise various other gears, such as, for example, a final drive ratio. The transmission may also be coupled to a tire via an axle. The tire may interface the vehicle to the road 23. Note that in one example embodiment, this powertrain is coupled in a passenger vehicle that travels on the road.

Figure 2:
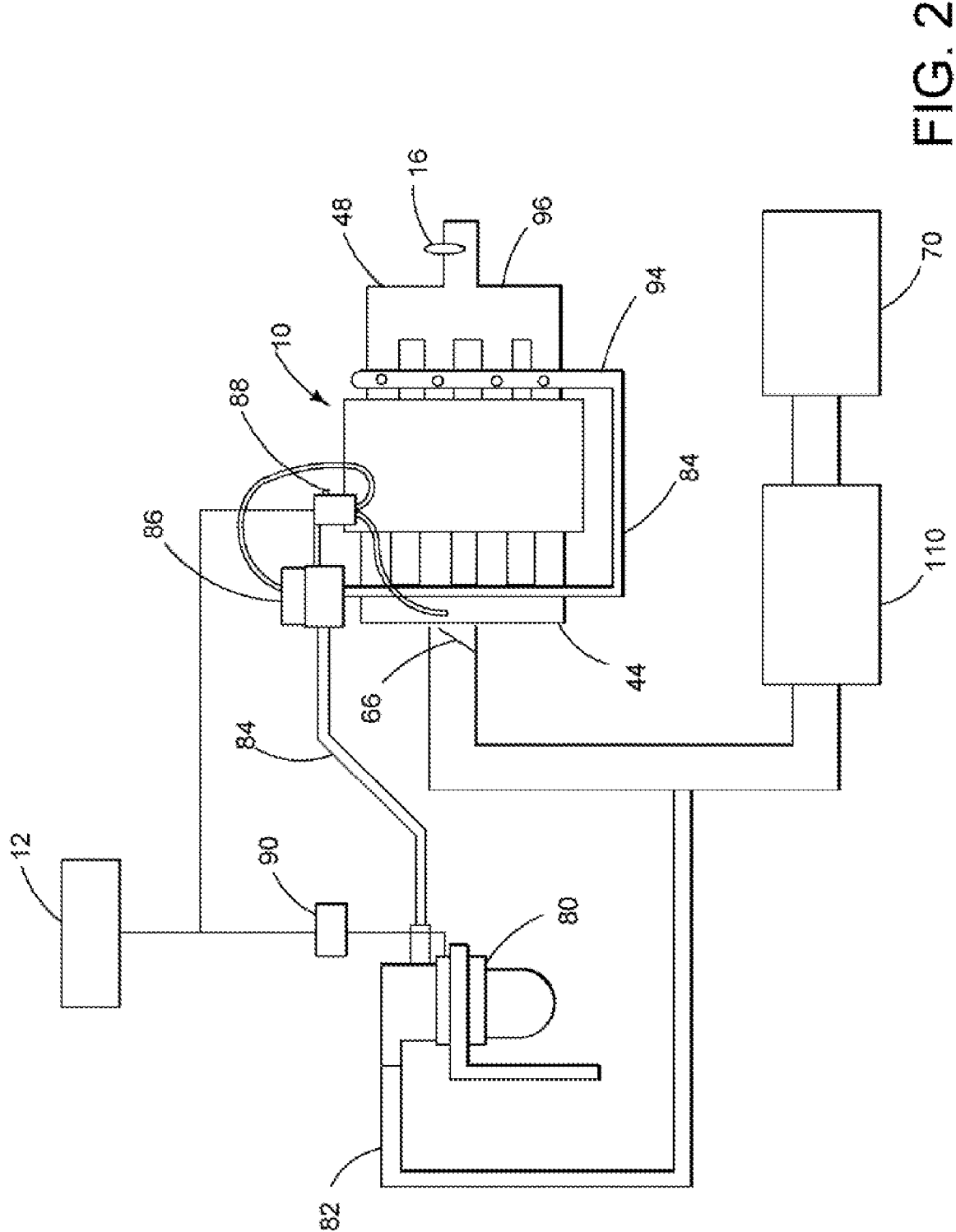

Referring now to FIG. 2, an example diagram of an engine and secondary airflow system are shown. Specifically, FIG. 2 shows an example four cylinder engine 10, although other engine types could be used, such as six, eight, ten, and/or 12 cylinder engines, for example. Further either inline, v-type, opposed, or other engine types may be used.

Continuing with FIG. 2, air pump 80 is shown, along with inlet and outlet ducts 82 and 84, respectively. The outlet duct 84 is coupled to the exhaust manifold 48 via a distribution manifold 94 located upstream of sensor 16, and upstream of a junction 96 of one or more of the exhaust ports. Specifically, distribution manifold 94 distributes airflow individually to each exhaust port runner. In one example, such distribution may provide improved emission reduction and faster temperature activation during engine starting. However, in an alternative embodiment, a single distribution can be used in the common exhaust manifold upstream of sensor 16 and downstream of junction 96.

In this example, a relay 90 is used to receive the command signal from control 12 to actuate pump 80. Additionally, vacuum operated valve with check valve 86 is shown coupled to solenoid control valve 88.

In some example, an advantage of this type of configuration is improved air-fuel control. Specifically, even during pump operation, the mass airflow sensor 110 measures engine airflow and pump flow. Therefore, the fuel injection can be regulated in proportion to the mass airflow sensor reading to maintain to maintain exhaust air-fuel mixture (engine airflow plus secondary airflow to injected fuel—which is primarily of concern for reducing emissions) at a desired value. Since the airflow measures both engine airflow plus secondary airflow in this configuration, less airflow uncertainty is obtained than when secondary airflow must be estimated in order to accurately control air-fuel ratio. For example, such an approach may be less sensitive to pump flow variability and/or pump flow degradation. Further, by using such a configuration, the pump can draw filtered airflow, and therefore can have less, or no, internal filtering.

However, while this provides more accurate overall exhaust mixture air-fuel ratio, it may still be desired to maintain the engine combustion air-fuel ratio within a desired range. In this case, the engine airflow for fuel control can be calculated by subtracting an estimate of pump flow (based on pump voltage, exhaust pressure, manifold pressure, etc.) from the mass airflow reading. Then, this difference between the mass airflow sensor and the pump flow can be used, along with a manifold filling model, to estimate the amount of air in the engine cylinders for combustion.

While this approach prioritized exhaust air-fuel ratio control over cylinder combustion air-fuel ratio, such an approach provides acceptable overall control at reduced system cost since small errors in combustion air-fuel ratio during rich operation may be more tolerable than exhaust mixture air-fuel ratio errors.

Note that this approach is optional and other air-fuel ratio control approaches may be used, if desired.

Figure 8:
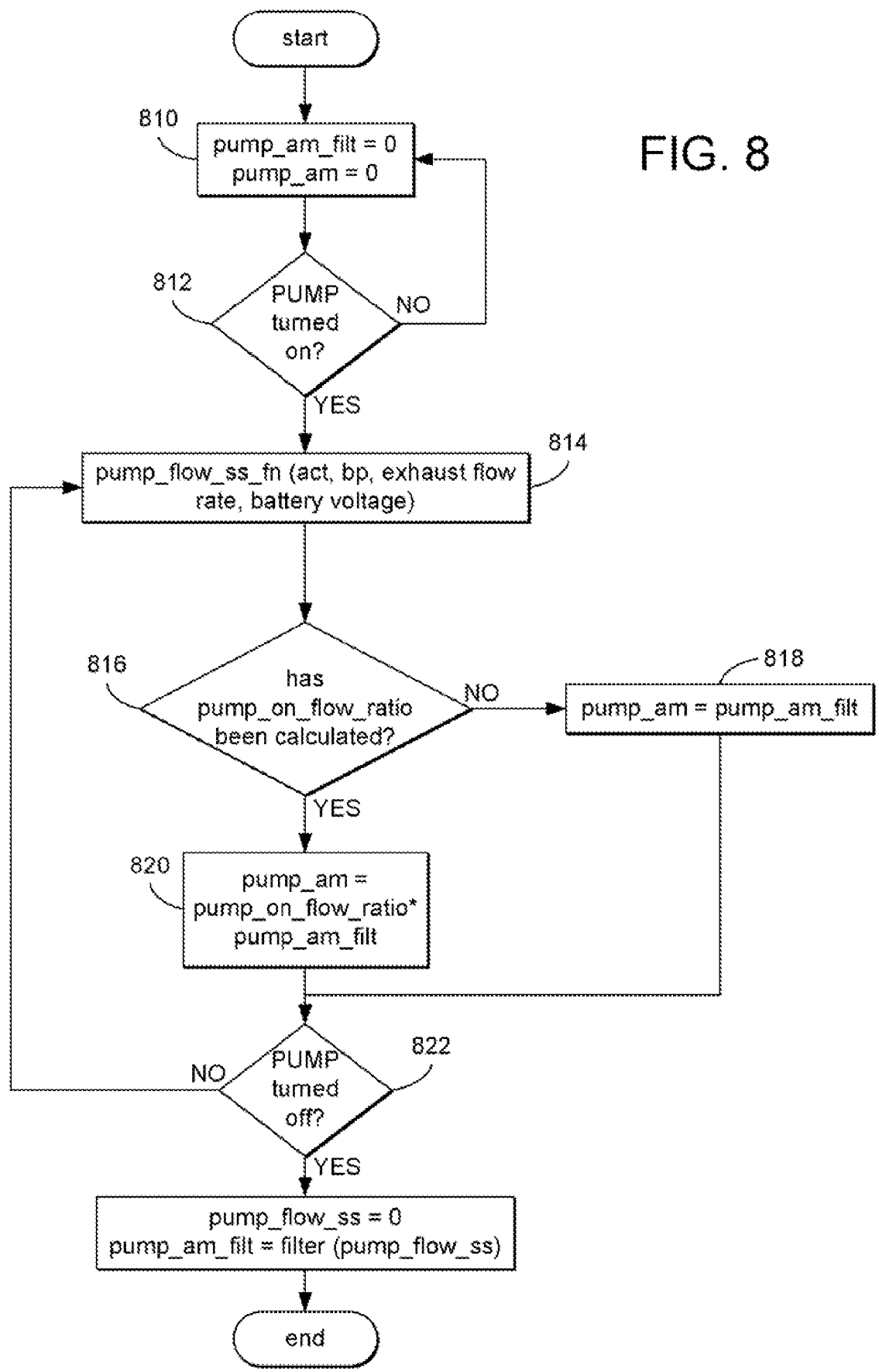

Referring now to FIG. 3, a schematic representation of an engine system is shown to illustrate various parameters used in the routines described below. These include:

maf_comp: measured airflow at the airmeter (sensor 110);

air_flow: model calculated throttle or engine flow based on measured throttle angle (and idle bypass valve, if equipped);

pump_flow_ss: steady-state model prediction of secondary airflow, without correction;

pump_am_filt: dynamic model prediction of secondary airflow, without correction;

pump_am: dynamic model prediction of secondary airflow, with correction described in the routine of FIG. 8;

air_chg_cur: air charge entering the cylinder.

pump_delta0: difference between measured flow from sensor 110 and predicted throttle body flow before pump 80 turns on, used to zero the throttle body model.

Further, leaks may be modeled as shown at 98, and heat generation and/or combustion are identified by stars 99, both in the combustion and in the exhaust.

As will be appreciated by one of ordinary skill in the art, the specific routines described below in the flowcharts may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the invention, but is provided for ease of illustration and description. Although not explicitly illustrated, one of ordinary skill in the art will recognize that one or more of the illustrated steps or functions may be repeatedly performed depending on the particular strategy being used. Further, these Figures graphically represent code to be programmed into the computer readable storage medium in controller 12.

Figure 4A:
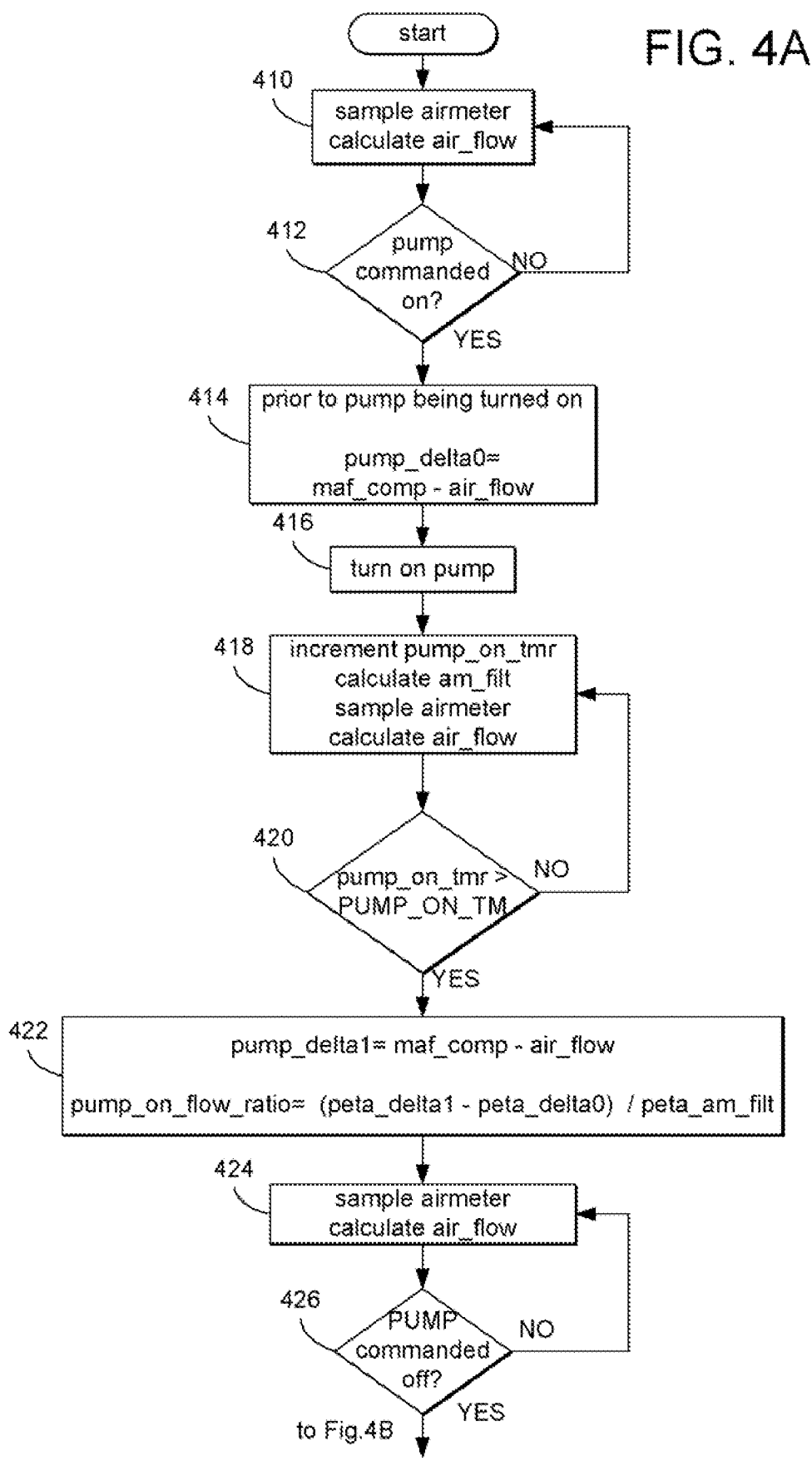

Referring now to FIG. 4, a routine is described for determining degradation of an outlet duct (specifically an outlet hose) of the secondary air system. First, in step 410, the routine samples the mass airflow sensor 110 (maf_comp) and calculates airflow (air_flow). The airflow value can be calculated in various different ways such as, for example: based on throttle angle, or based on engine speed and throttle angle, for example. Next, in step 412, the routine determines whether the pump 80 is to be commanded on. If the answer to step 412 is "no", the routine returns to step 410. Alternatively, when the answer to step 412 is "yes", the routine continues to step 414.

In step 414, the routine calculates a first difference (pump_delta0) based on the difference between the airflow sensor sample value (maf_comp) and the engine airflow. In this way, the routine obtains a relative flow value before the pump is activated. Next, in step 416, the routine turns on pump 80. Then, in step 418, the routine increments a pump timer (pump_on_tmr) and calculates a filtered pump air amount (pump_am_filt). This pump air amount value can be calculated based on various parameters and data indicative of pump flow functionality as described below here with regard to FIG. 8.

In addition, in step 418, the airflow sensor 110 is again sampled, and the engine flow calculated. Next, in step 420, the routine determines whether the pump on timer is greater than a threshold value (PUMP_ON_TM). When answer to step 420 is "no", the routine returns to step 418. When the answer to step 420 is "yes", the routine continues to step 422.

In step 422, the routine calculates another pump difference (pump_delta1) based on the difference between the latest airflow sensor reading and the calculated engine flow. Further, the routine calculates a pump turn-on flow ratio (pump_on_flow_ratio) based on the difference between the difference values divided by the filtered pump flow air amount. Next, in step 424, the routine again samples the airflow sensor reading and calculates the engine flow. Next, in step 426, the routine determines whether the pump has been commanded off. If not, the routine returns to step 424. Alternatively, when the answer to step 426 is "yes", the routine continues to step 428. In step 428, the routine determines whether the pump turn-on flow ratio is greater than a maximum allowable turn-on flow ratio (pump_on_flow_ratio_max). If not, the routine continues to step 430 to indicate an outlet hose degradation has not been detected.

Alternatively, when the answer to step 428 is "yes", the routine continues to step 432. In step 432, the routine determines whether close loop air/fuel ratio control has been active for greater than a calibratable amount of time (for example, X seconds). Alternatively, different types of durations can be used, such as a predetermined number of engine revolutions or cycles, a number of air/fuel control corrections, or a number of vehicle miles.

If the answer to step 432 is "no", the routine continues to step 434 to indicate that it is unable to complete the outlet how diagnostic test. Alternatively, when the answer to step 432 is "yes", the routine continues to step 436. In step 436, the routine determines whether the closed loop fuel control was able to achieve a target air/fuel ratio within a desired range. In other words, the routine determines whether the close loop air/fuel control is able to adjust the exhaust mixture air/fuel ratio of combusted rich gases from the cylinder and excess air from the pump to within a calabratable amount of a desired exhaust mixture air/fuel ratio. If not, the routine continues to step 440 to indicate that an outlet hose degradation has been identified. Alternatively, when the answer to step 436 is "yes", the routine continues to 438 to further monitor whether an excessive enleanment was required to achieve the target air/fuel ratio of the exhaust mixture. If so, the routine also continues to step 442 to indicate an outlet hose degradation has been identified. Alternatively, if the answer to step 438 is "no", the routine continues to step 430 to indicate that the outlet hose test has been completed successfully.

In this way, it is possible to accurately determine the degradation of an outlet hose of the secondary air system specifically, while reducing false identification of degradation. Specifically, while using the flow ratio of pump flow, it may be possible to achieve a more accurate determination of operating conditions, while reducing pump estimation variability effects on the diagnostic approach.

In other words, by using a ratio of two pump flow estimates, it is possible to reduce estimation errors in the pump flow values, rather than simply comparing an estimated pump flow to limit values or an allowable range. Further, even when the pump ratio is outside its limits, a further check on whether air-fuel ratio control was achieved (and even if it was achieved, whether too much corrective action was required) is used to more accurately detect and identify degradation of the inlet and/or outlet hose.

Referring now to FIG. 5, a routine is described for determining degradation of an inlet duct (specifically an inlet hose) of the secondary air system. First, in step 510, the routine samples the mass airflow sensor 110 (maf_comp) and calculates airflow (air_flow). Next, in step 512, the routine determines whether the pump 80 is to be commanded on. If the answer to step 412 is "no", the routine returns to step 510. Alternatively, when the answer to step 512 is "yes", the routine continues to step 514.

In step 514, the routine calculates a first difference (pump_delta0) based on the difference between the airflow sensor sample value (maf_comp) and the engine airflow. In this way, the routine obtains a relative flow value before the pump is activated. Next, in step 516, the routine turns on pump 80. Then, in step 518, the routine increments a pump timer (pump_on_tmr) and calculates a filtered pump air amount (pump_am_filt). This pump air amount value can be calculated based on various parameters and data indicative of pump flow functionality as described below here with regard to FIG. 8.

In addition, in step 518, the airflow sensor 110 is again sampled, and the engine flow calculated. Next, in step 520, the routine determines whether the pump on timer is greater than a threshold value (PUMP_ON_TM). When answer to step 520 is "no", the routine returns to step 518. When the answer to step 520 is "yes", the routine continues to step 522.

In step 522, the routine calculates another pump difference (pump_delta1) based on the difference between the latest airflow sensor reading and the calculated engine flow. Further, the routine calculates a pump turn-on flow ratio (pump_on_flow_ratio) based on the difference between the difference values divided by the filtered pump flow air amount. Next, in step 524, the routine again samples the airflow sensor reading and calculates the engine flow. Next, in step 526, the routine determines whether the pump has been commanded off. If not, the routine returns to step 524. Alternatively, when the answer to step 526 is "yes", the routine continues to step 528. In step 528, the routine determines whether the pump turn-on flow ratio is less than a minimum allowable turn-on flow ratio (pump_on_flow_ratio_min). If not, the routine continues to step 530 to indicate an inlet hose degradation has not been detected.

Alternatively, when the answer to step 528 is "yes", the routine continues to step 532. In step 532, the routine determines whether close loop air/fuel ratio control has been active for greater than a calibratable amount of time (for example, X seconds). Alternatively, different types of durations can be used, such as a predetermined number of engine revolutions or cycles, a number of air/fuel control corrections, or a number of vehicle miles.

If the answer to step 532 is "no", the routine continues to step 534 to indicate that it is unable to complete the inlet how diagnostic test. Alternatively, when the answer to step 532 is "yes", the routine continues to step 536. In step 536, the routine determines whether the closed loop fuel control was able to achieve a target air/fuel ratio within a desired range. In other words, the routine determines whether the close loop air/fuel control is able to adjust the exhaust mixture air/fuel ratio of combusted rich gases from the cylinder and excess air from the pump to within a calabratable amount of a desired exhaust mixture air/fuel ratio. If not, the routine continues to step 540 to indicate that an inlet hose degradation has been identified. Alternatively, when the answer to step 536 is "yes", the routine continues to 538 to further monitor whether an excessive enleanment was required to achieve the target air/fuel ratio of the exhaust mixture. If so, the routine also continues to step 542 to indicate an inlet hose degradation has been identified. Alternatively, if the answer to step 538 is "no", the routine continues to step 530 to indicate that the inlet hose test has been completed successfully.

In this way, it is possible to accurately determine the degradation of an inlet hose of the secondary air system specifically, while reducing false identification of degradation. Specifically, while using the flow ratio of pump flow, it may be possible to achieve a more accurate determination of operating conditions, while reducing pump estimation variability effects on the diagnostic approach.

In other words, by using a ratio of two pump flow estimates, it is possible to reduce estimation errors in the pump flow values, rather than simply comparing an estimated pump flow to limit values or an allowable range. Further, even when the pump ratio is outside its limits, a further check on whether air-fuel ratio control was achieved (and even if it was achieved, whether too much corrective action was required) is used to more accurately detect and identify degradation of the inlet and/or outlet hose.

Further details of the inlet and outlet hose test using the above routine are now illustrated.

Specifically, when the inlet hose is off (or partially off), the pump still flows the same amount of air into the exhaust, but it is drawing air from (or partially from) atmosphere instead of air measured by the mass airflow sensor. The lack of expected flow through the mass airflow sensor can then be used in the flow ratio calculations to identify such a situation, and signify the pump flow is not as expected. However, in addition, the fuel control system may still be fueling for the airflow sensor, and therefore the excess air that is going in to the exhaust may cause the exhaust air fuel ratio to be as much as 30% lean.

Therefore, in one example, in order to identify an inlet hose degradation, the pump flow ratio test is used to indicate pump flow is not as expected, and the exhaust air fuel ratio indicating too lean is used.

To determine if exhaust air/fuel ratio is too lean, the following approach may be used, as indicated in FIGS. 4 and 5. Specifically, a calibrate-able duration is required (e.g., a time limit of 3 seconds) to be in closed loop fuel during pump operation in order to enable using exhaust air-fuel ratio information for secondary air system diagnostics. Then, since pump operation is typically during idle conditions, the fuel control may not have enough time to drive the HEGO to switch. Therefore, if no switch occurred and the pump flow ratio indicates potential degradation, an inlet hose degradation flag may be set. However, during driving modes, HEGO switches are more likely, so if a HEGO switch occurs, the ratio of adaptive keep alive memory air-fuel parameter (PUMP_KAM_AVG) to the instantaneous feedback air-fuel ratio correction amount (PUMP_LAM_AVG) is calculated to determine the magnitude of air/fuel shift present. This air/fuel shift is then compared to calibrated scalar that is normalized to the ratio of estimated pump flow to maximum pump flow.

The calculation is:

$$1+/-PETA\_HOSE\_AF\_SHIFT*pump\_am/fnpeta\_am(0).$$

Where, PETA_HOSE_A_F_SHIFT is a scalar representing the lambda air-fuel shift that would indicate a hose off condition at nominal conditions with lowest nominal backpressure, and fnpeta_am(0) is the pump flow at nominal conditions with lowest nominal backpressure.

Further details of the outlet hose test using the above routine are now illustrated. Specifically, when the outlet hose is off (or partially off), the pump flows more air than anticipated, since exhaust backpressure is no longer impacting pump flow. The airflow sensor can be used in the flow ratio calculations to indicate the excess air drawn through the system, and signify the pump flow is not as expected, which can be detected by the flow ratio calculations. Further, during these conditions, engine air/fuel may be clipped to reduce any over-richness of the combustion air-fuel ratio in the engine. However, since the outlet hose is disconnected (or partially disconnected), the pump air may not be delivered to the exhaust system, potentially causing the exhaust air/fuel to be up to 30% rich at idle.

Thus, in order to identify an outlet hose degradation, the pump on flow ratio test is used to indicate excess flow and the exhaust air/fuel ratio is monitored to determine wither it is becoming too rich.

Figure 6A:
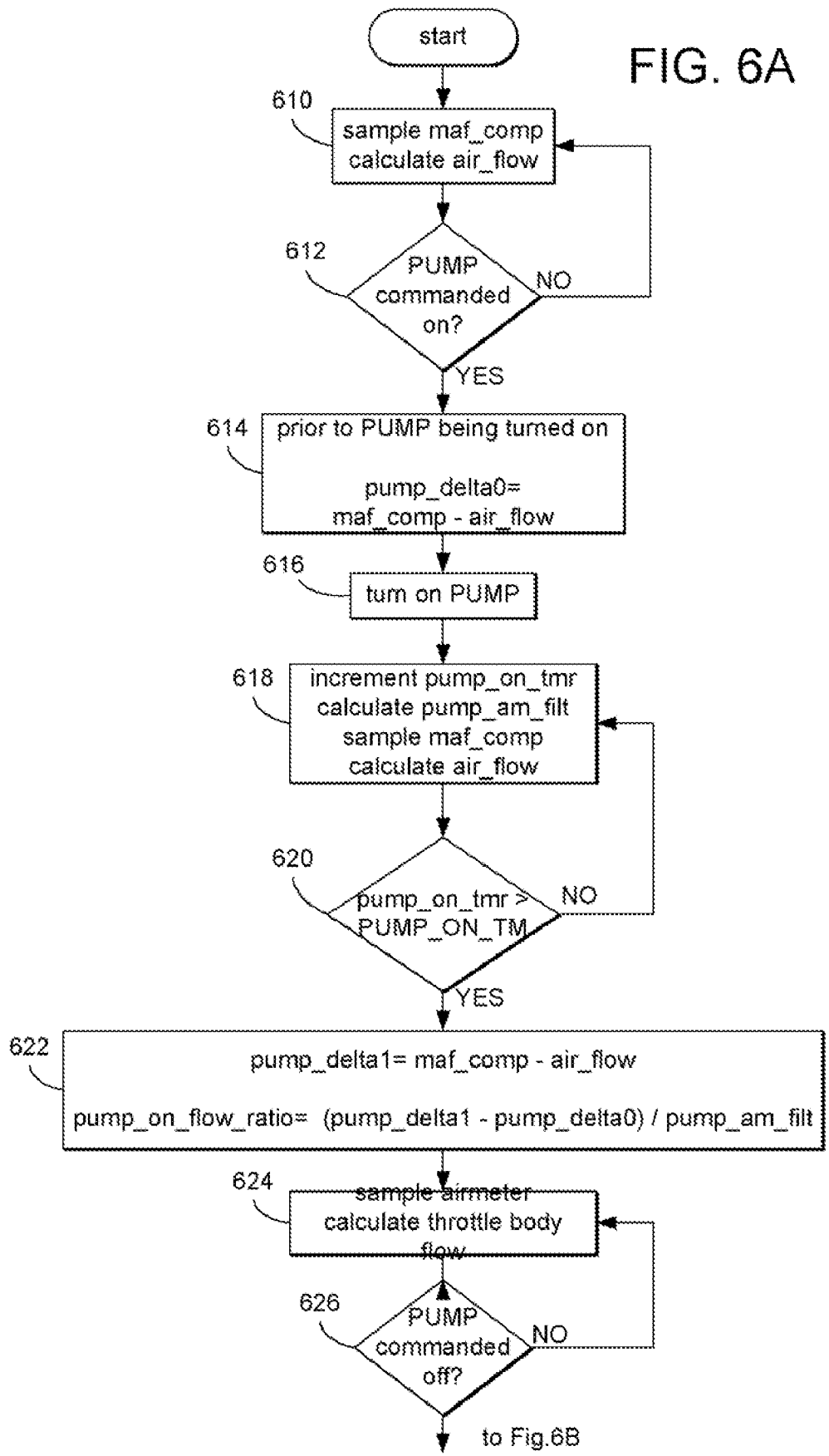
Figure 6B:
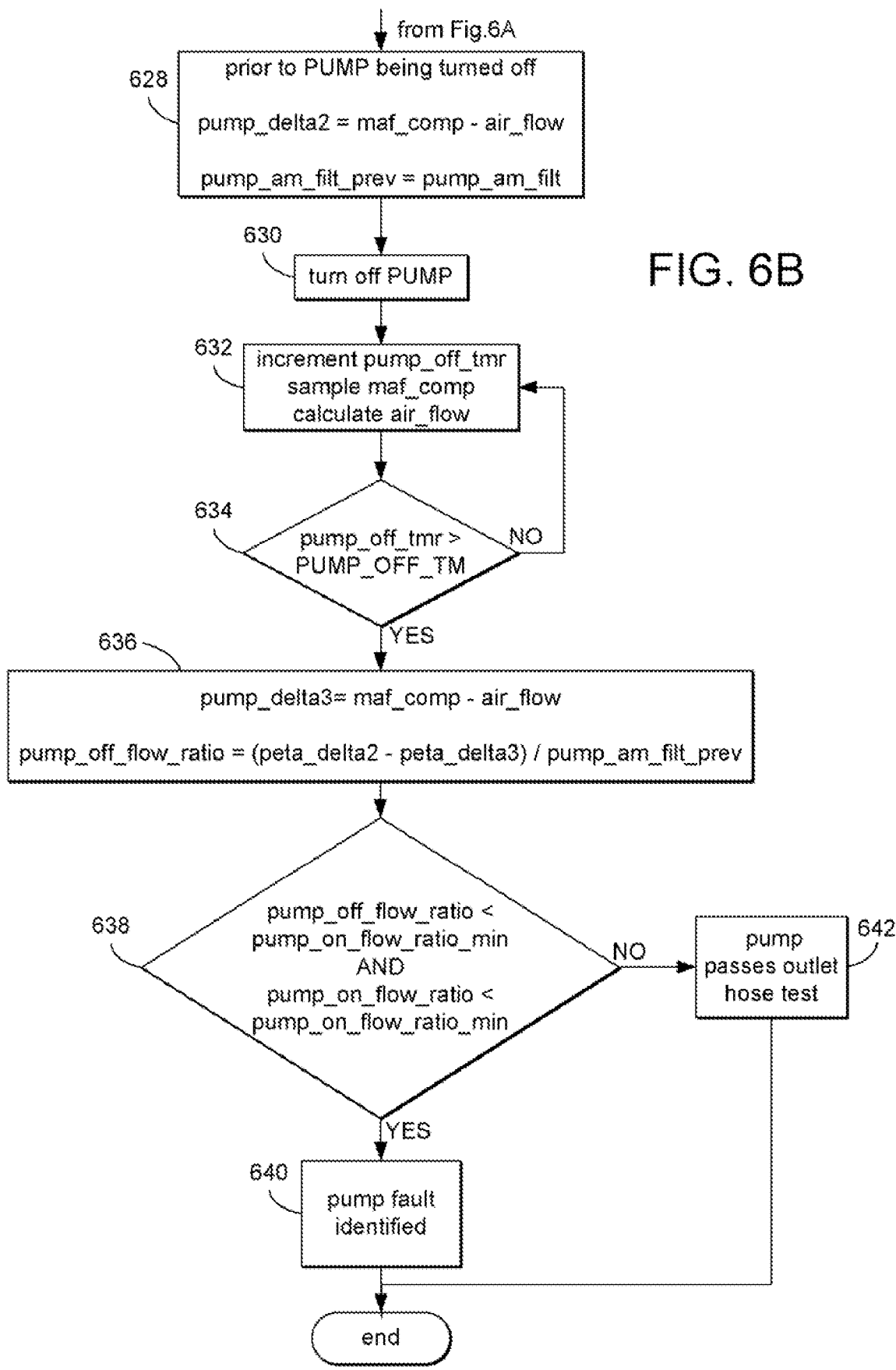

Referring now to FIG. 6, a routine is described for determining degradation of pump 80 using flow ratios. First, in step 610, the routine samples the mass airflow sensor 110 (maf_comp) and calculates airflow (air_flow). Next, in step 612, the routine determines whether the pump 80 is to be commanded on. If the answer to step 612 is "no", the routine returns to step 610. Alternatively, when the answer to step 512 is "yes", the routine continues to step 614.

In step 614, the routine calculates a first difference (pump_delta0) based on the difference between the airflow sensor sample value (maf_comp) and the engine airflow. In this way, the routine obtains a relative flow value before the pump is activated. Next, in step 616, the routine turns on pump 80. Then, in step 618, the routine increments a pump timer (pump_on_tmr) and calculates a filtered pump air amount (pump_am_filt). This pump air amount value can be calculated based on various parameters and data indicative of pump flow functionality as described below here with regard to FIG. 8.

In addition, in step 618, the airflow sensor 110 is again sampled, and the engine flow calculated. Next, in step 620, the routine determines whether the pump on timer is greater than a threshold value (PUMP_ON_TM). When answer to step 620 is "no", the routine returns to step 618. When the answer to step 620 is "yes", the routine continues to step 622.

In step 622, the routine calculates another pump difference (pump_delta1) based on the difference between the latest airflow sensor reading and the calculated engine flow. Further, the routine calculates a pump turn-on flow ratio (pump_on_flow_ratio) based on the difference between the difference values divided by the filtered pump flow air amount. Next, in step 624, the routine again samples the airflow sensor reading and calculates the engine flow. Next, in step 626, the routine determines whether the pump has been commanded off. If not, the routine returns to step 624. Alternatively, when the answer to step 626 is "yes", the routine continues to step 628. In step 628, prior to turning the pump off, the routine determines another flow difference (pump_delta2) based on the difference between the latest airflow sensor reading and the calculated engine flow. Further, the routine filters the saves the current filtered pump flow estimate (pump_am_filt) as a previous value.

Then, in step 630, the routine turns the pump off. Next, in step 632, the routine increments a pump off timer (pump_off_tmr), samples the mass airflow sensor, and calculates engine flow. In step 634, the routine determines whether the pump off timer is greater than a threshold value (PUMP_OFF_TM). When answer to step 634 is "no", the routine returns to step 632. When the answer to step 634 is "yes", the routine continues to step 636.

In step 636, the routine calculates another pump difference (pump_delta3) based on the difference between the latest airflow sensor reading and the calculated engine flow. Further, the routine calculates a pump turn-off flow ratio (pump_off_flow_ratio) based on the difference between the difference values (pump_delta2−pump_delta3) divided by the previous filtered pump flow air amount. Next, in step 638, the routine determines whether the off flow ratio is less than a minimum value and the on flow ratio is less than a minimum value. If so, the routine indicates pump degradation in step 640. Otherwise, no degradation is detected at step 642.

Thus, in one example, a pump flow monitor may use a flow ratio of the change in airflow sensor flow during pump transitions to the expected change in flow from the pump flow model. Comparing this flow ratio to selected limits then indicates whether pump flow is as expected. Further, an engine flow estimate (or throttle body flow estimate) may be optionally used to normalize out variance in the airflow sensor and changes in airflow due to driver input.

Further, in one example, to provide increased accuracy, the flow monitoring for both the on and the off transition are used. In another example, noise may be reduced by taking a 3 sample average of the airflow sensor and the airflow models at each sampling location.

Figure 7:
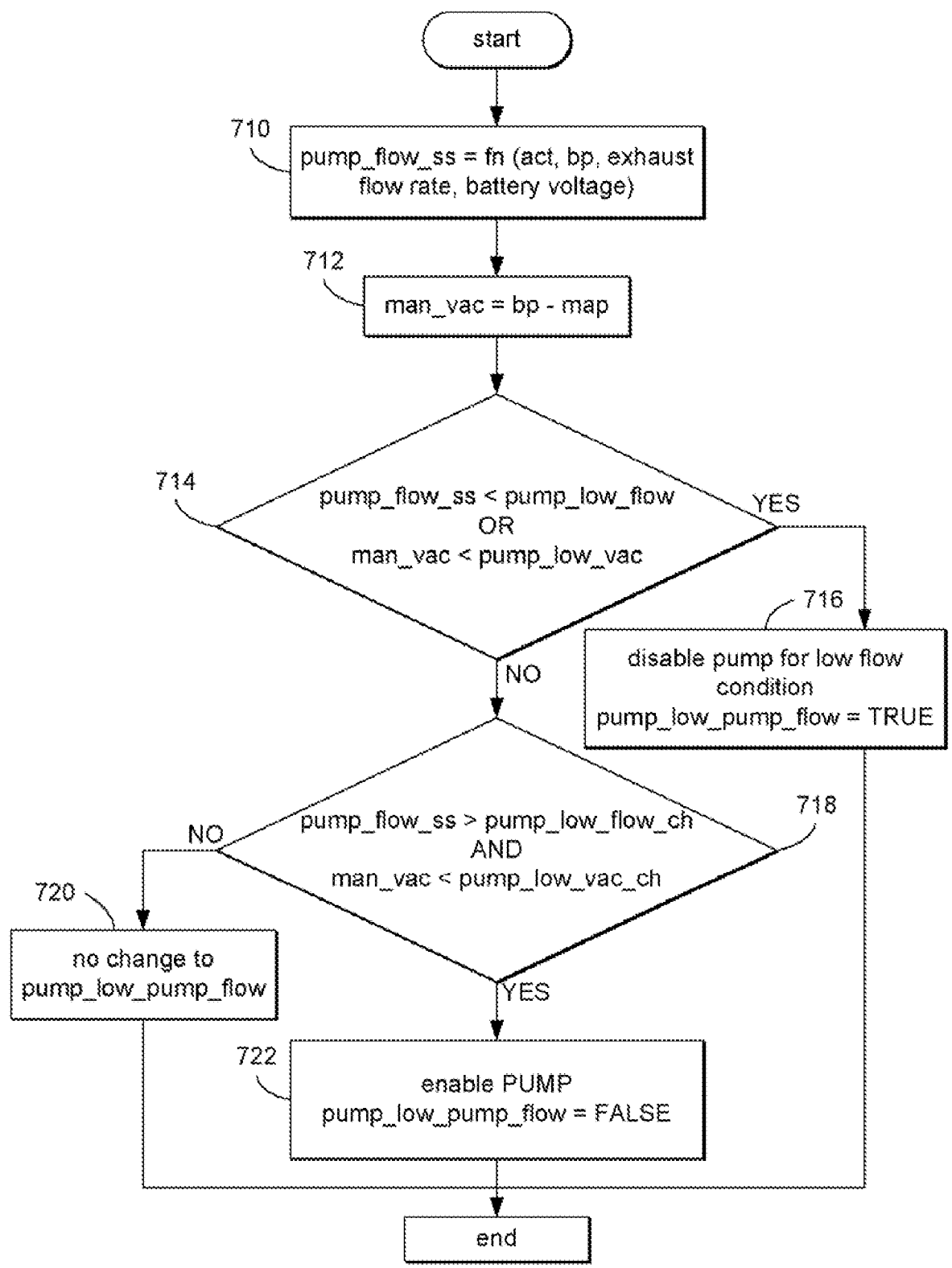

Referring now to FIG. 7, a routine for disabling secondary air operation during selected conditions is described. Specifically, in step 710 the routine determines an estimate of pump flow (pump_flow_ss) based on pump characteristics and operating conditions. For example, the pump flow can be estimated based on air temperature (ACT), barometric pressure (bp), exhaust flow rate, and/or batter voltage for the case of an on/off pump control. Various other estimates could also be used.

Next, in step 712, the routine determines manifold vacuum (man vac) as the difference between barometric pressure (bp) and manifold pressure (map). Then, in step 714, the routine determines whether the pump flow estimate (pump_flow_ss) is less than a low flow threshold (pump_low_flow) or manifold vacuum is below a vacuum threshold (pump_low_vac). If either case is true, the routine continues to step 716 to disable pump operation while the condition is present and sets the flag (pump_low_lump_flow) equal to TRUE.

Alternatively, if neither case is true in step 714, the routine continues to step 718 to determine whether the pump flow estimate (pump_flow_ss) is greater than a second low flow threshold (pump_low_flow_ch) and manifold vacuum is below a second vacuum threshold (pump_low_vac_ch). These second threshold may be used to prevent excessive switching on and off of pump flow and thereby provide some hysteresis. When the answer to step 718 is no, the routine continues to step 720 and does not change the pump flow flag (pump_low_lump_flow). Alternatively, when the answer to step 718 is yes, the routine continues to step 722 to enable pump operation and set the flag (pump_low_lump_flow) to FALSE.

In this way, operation where low pump flow can cause degraded results may be reduced. Fore example, as throttle position increases, the exhaust backpressure increases, reducing pump flow to the exhaust. At significant pressures, the system may provide reduced or no additional heat and is costing horsepower and fuel economy.

Pump operation during high back pressure conditions may also reduce signal to noise for the diagnostic monitor as well. To regain wasted horsepower and fuel economy, and avoid or reduce monitoring during reduced signal to noise conditions, the pump may be disabled during high backpressure and/or low pump flow conditions. If the system returns to a low backpressure condition (e.g., the driver tips out of the throttle), the pump may be re-enabled (provided that all other pump entry conditions are satisfied).

As an example, one calibration for pump low flow disablement is 0.2 lbm/min and 0.5 lbm/min re-enablement.

Also, since in one example the control valve for the pump may be vacuum actuated, there may be a minimum amount of vacuum required. For example, 10 inches of vacuum may required. Thus, when the pump is on and the valve is reducing flow to the exhaust due to lack of vacuum, the diagnostic monitor and the estimate of engine air mass may become less accurate. Therefore, in one example, pump operation may be disabled due to low vacuum to avoid the above conditions.

As an example, one calibration disables pump flow at 6 inches of vacuum and re-enablement is at 8 in Hg.

Note that pump operation can also be disabled if any of an inlet duct, outlet duct, or pump degradation has been detected.

Referring now to FIG. 8, a routine is described for updating and/or correcting the pump flow estimate determined from FIG. 7. Specifically, in step 810 the routine initializes the current and filtered pump flow estimates to zero while the pump is off. Then, in step 812, the routine determines whether the pump is turned on. If not, the routine returns to step 810. If so, the routine continues to step 814 where the pump flow estimate (pump_flow_ss) is calculated as in step 710. Further, if desired, the estimate can be filtered with a low pass filter to form a filtered estimate (pump_am_filt).

Next, in step 816, the routine determines whether pump turn-on flow ratio (pump_on_flow_ratio) has been calculated (see FIG. 3, for example). If not, the routine continues to step 818 to set the current pump flow estimate (pump_am) to the filtered estimate (pump_am_filt). If so, the routine continues to step 820 to update the current pump flow estimate based on the turn-on flow ratio. Specifically, the current pump flow estimate (pump_am) is set equal to the product of the filtered estimate (pump_am_filt) and the pump turn-on flow ratio (pump_on_flow_ratio).

Continuing with FIG. 8, in step 822 the routine then determines whether the pump is turned off. If no, the routine returns to step 814. If so, the routine continues to step 824 to set the flow estimates (pump_flow_ss) to zero, and continue filtering this value to form the filtered pump flow. Note that the filtering accounts for the delay in the flow amount at the pump reaching the exhaust and/or cylinder.

In this way, it is possible to obtain an accurate estimate of the pump flow amount in the engine system to be used to adjust ignition timing, torque estimates, etc. for improved engine control. In other words, the pump flow characteristics may be different depending on whether the pump is being turned on, maintained on, or being turned off. During the on transition, the change in airflow may be gradual as the pump spins up, and fueling via the air meter is accurate (see FIG. 9 below). During the off transition, the valve shuts off the airflow to the exhaust much faster, and the pump contribution to the exhaust mixture may be depleted in less than 200 ms, for example. This may leave excess fuel in the intake manifold puddles that may require several engine cycles to be depleted to the desired level. Therefore, in one example, the fuel is filtered out while the pump is held on for a duration, such as 300 ms, or a number of engine cycles, allowing the excess fuel to burn through the engine before the pump is disabled.

Note that since engine flow may be determined based on the difference between mass airflow and estimated pump flow (based on pump characteristics, pressure, etc.), errors may occur. There may also be some secondary air system degradation modes that could cause the mass airflow sensor based air-fuel control system to drive the engine rich beyond desired in order to maintain exhaust air fuel ratio. These modes may include: much higher than expected Pump Flow, much higher than expected MAF reading that is not yet adapted, or much higher than expected BP reading. To reduce rich stall conditions, the engine may be protecting against over-fueling by using a clip to the engine air amount calculation to reduce such possibilities.

It will be appreciated that the configurations and routines disclosed herein are exemplary in nature, and that these specific embodiments are not to be considered in a limiting sense, because numerous variations are possible. For example, the system can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for an engine having an intake system and an exhaust system, comprising:
    an airflow sensor coupled to the intake system;
    a throttle plate coupled to the intake system downstream of said airflow sensors;
    an air pump having at least an inlet side and an outlet side;
    an exhaust gas oxygen sensor coupled to the exhaust system;
    a first, upstream, duct having at least a first end coupled to said inlet of said pump and a second end coupled to the intake system downstream of said airflow sensor and upstream of said throttle plate;
    a second, downstream, duct having at least a first end coupled to said outlet of said pump and a second end coupled to the exhaust system, said second end of said second duct being coupled to multiple locations of the exhaust system upstream of said exhaust gas oxygen sensor; and
    a controller coupled to the engine, said controller, during operation, identifying whether degradation has occurred to at least one of said first duct and said second duct, distinguishing between degradation of said first duct and said second duct, and providing an indication of said identified, distinguished, degradation.

2. The system of claim 1 wherein the engine is a direct fuel injection engine.

3. A system for an engine having an intake system and an exhaust system, comprising:
    an airflow sensor coupled to the intake system;
    an air pump having at least an inlet side and an outlet side;
    a first duct having at least a first end coupled to said inlet of said pump and a second end coupled to the intake system downstream of said airflow sensor;
    a second duct having at least a first end coupled to said outlet of said pump and a second end coupled to the exhaust system; and
    a controller coupled to the engine, said controller, during operation, identifying whether degradation has occurred to at least said air pump based on a first ratio of first and second pump flow estimates during pump turn-on transition, and further based on a second ratio of the first and second pump flow estimates during pump turn-off transition, and providing an indication of said identified degradation.

4. The system of claim 3 further comprising:

a throttle plate coupled to the intake system downstream of said airflow sensor and downstream of said second end of said first duct; and an exhaust gas oxygen sensor coupled to the exhaust system;

said second end of said second duct being coupled to multiple locations of the exhaust system upstream of said exhaust gas oxygen sensor, and said first pump flow estimate based on the airflow sensor and said second pump flow estimate based on a pump model.

5. The system of claim 3 wherein said controller determines one of said pump flow estimates based on pump characteristics.

* * * * *